United States Patent [19]

McIntosh

[11] 4,344,699

[45] Aug. 17, 1982

[54] EXPOSURE AND CONTRAST DETERMINATION BY PRESCANNING IN ELECTRONIC PHOTOPRINTING SYSTEMS

[75] Inventor: Walter L. McIntosh, Woodbridge, Va.

[73] Assignee: Log Etronics, Inc., Springfield, Va.

[21] Appl. No.: 270,758

[22] Filed: Jun. 5, 1981

[51] Int. Cl.³ .................. G03B 27/16; G03B 27/80
[52] U.S. Cl. .................................. 355/20; 355/68; 355/71; 355/81; 355/83
[58] Field of Search ................ 355/20, 38, 68, 80, 355/81, 83, 71

[56] References Cited

U.S. PATENT DOCUMENTS 4,265,532  5/1981  McIntosh ........................ 355/20

Primary Examiner—Michael L. Gellner
Attorney, Agent, or Firm—William D. Hall; Kenneth L. King

[57] ABSTRACT

Automatic control of exposure level and contrast correction for a photographic printer is disclosed. The printer uses dynamic masking achieved by modulating the intensity and velocity of a CRT scanning spot. A prescan is employed to evaluate the negative and establish exposure level and contrast grade excursion limits for the subsequent exposure. Different control systems are disclosed for contact printing and projection printing.

30 Claims, 6 Drawing Figures

EXPOSURE AND CONTRAST DETERMINATION BY PRESCANNING IN ELECTRONIC PHOTOPRINTING SYSTEMS

CROSS REFERENCE TO RELATED APPLICATIONS

The present invention is an improvement upon the systems disclosed in commonly-owned U.S. Pat. Nos. 2,842,025, issued July 8, 1958; 3,036,497, issued May 29, 1962; and 4,265,532, issued May 5, 1981, the disclosures of which are incorporated herein by reference.

BACKGROUND OF THE INVENTION

This invention is an improvement in scanning light source photographic printers used to make reproductions on film or paper from transparencies. Photographic prints are usually produced with the objective of employing the full tonal scale of the reproducing emulsion, in order to render a visually pleasing image. To this end, a variety of black and white photographic materials are available for choice, such as papers exhibiting graded or variable contrast, as well as long-scale, low-contrast or short-scale, high contrast films. Additionally, the contrast of such materials can be further controlled by appropriate adjustments to time and temperature during the processing development step.

The operation of print exposure determination is usually one in which the density range existing in the original is matched, by some means, to the contrast limits of the reproducing medium so that the intensity-time product $(I \times T = E)$ of light passing through the original exposes the desired high and low density points on the reproducing emulsion. Pictorial and artistic photography, particularly as performed by professionals, usually allows for experimental adaptation and the choice of emulsion contrast and exposure time. However, in the fields of scientific, industrial, medical, military and photogrammetric photography, among others, it is impractical for the darkroom technician to attempt to assess the individual characteristics of each original photograph in a situation where thousands of images may have to be copied uniformly.

Scanning light source photographic reproduction devices, specifically those of the type called d-c coupled dodging printers, provide automatic exposure control by compensating for local density differences in the original transparency. As the light source scans a particular point in the transparency, the optical transmission of that point is sensed photoelectrically and the local intensity-time product of the printer exposure is controlled inversely. An excellent mathematical analysis of dodging printers (also called luminous masking printers) is provided in U.S. Pat. No. 3,400,632 to Wahli. As is noted by Craig, in U.S. Pat. No. 2,921,512 assigned to the assignee of this application, reproductions where the gross contrast is substantially reduced as a result of luminous masking are frequently scientifically informative but pictorially unpleasing. McIntosh, in U.S. Pat. No. 4,265,532 also assigned to the assignee of this application, indicates that electronic dodging is a tone distorting reproduction process and describes a method enabling less than maximum dodging to be obtained.

In general, for the most pleasing appearance of the reproduction, the degree of dodging selected should be that lowest amount which will enable all necessary information to be displayed with the greatest allowable tonal separation, or contrast. Heretofore, such a criterion has required knowledge of the exposure range of the receiving emulsion, an individual examination of each transparency, classification of the type of photography, and recognition of the characteristics of the reproduction process, either by contact or by projection printing.

The examination of an individual black and white transparency should produce at least five elements of information:

$D_{max}$      1

$D_{min}$      2

$\Delta D = D_{max} - D_{min}$      3

$D_{avg} = (D_{max} + D_{min})/2$      4

$D_{sum} = (1/n)(D_1 + D_2 + D_3 \ldots D_n)$      5

The $\Delta D$ information must be compared to the emulsion exposure range so that when $\Delta D$ is less, no dodging is necessary; when $\Delta D$ is slightly greater, some dodging is required; and when $\Delta D$ is considerably greater, maximum dodging may be needed. The $D_{avg}$ information represents the arithmetic average of the density extremes and it, or some function $kD_{avg}$ of it, is useful when reproducing pictorial subjects. Aerial photography, however, and various types of medical and scientific photography, is reproduced best when $D_{sum}$ is employed, because all elements of the imagery may well be of equal visual importance. Thus, the greater the number of points measured and averaged, the greater will be the probability that most photographic areas will be reproduced at or near their optimum exposure.

The Callier effect exerts an important influence over the contrast of the printing process used. Contact printers require density measurements to be made by measuring the diffused light after it has passed through the negative. Projection printers, however, require measurement of specular or projected density in order to achieve correct contrast evaluation. Applying the diffuse density measuring technique to projection printing will result in invalid measurements. Thus, it is necessary to use a different measuring technique for a contact printer than for a projection printer.

From all of the foregoing, it is clear that extraction of such a mass of image information by manual methods, although conceptually possible, is quite impractical, and that rapid preexposure evaluation of the applicable parameters of photographic transparencies requires recourse to an automatic device.

PRIOR ART STATEMENT

The prior art for the present invention falls into two distinct categories.

The first category includes traditional "white light" printers that prescan the negative for a variety of reasons, but are unable to alter exposure contrast. Some of these printers modify the effective contrast range of the paper by "flashing" the paper prior to (or during) the main exposure, but the image contrast during exposure remains unchanged.

Examples of this type of reference are: Biedermann et al, U.S. Pat. No. 3,034,400; Bickl et al., U.S. Pat. No. 4,082,465; Knör et al., U.S. Pat. No. 4,176,964; and Treiber, U.S. Pat. No. 4,239,384. These references all teach prescanning of a negative before exposure. Biedermann et al scan for the express purpose of measuring contrast and do determine an equivalent to applicants ΔD signal, but do not determine $D_{min}$, $D_{max}$, or $D_{sum}$. Biedermann, however, is unable to alter the contrast excursion range of the exposure because a conventional light source is used. Biedermann et al., therefore, depend upon pre-exposure or "non-image flashing" of the reproduction material to improve the subsequent exposure of detail in the toe region of the emulsion.

The second category of prior art includes electronic printers that employ dynamic masking during exposure. These devices are able to alter the image contrast excursion range, but do not normally employ a prescan. These references may be further divided into two subgroups: (a) Bestenreiner et al., U.S. Pat. No. 3,984,187; and Kelly, U.S. Pat. No. 4,145,709, which do employ a prescan; and (b) McIntosh, U.S. Pat. No. 4,265,532; Causley, British Pat. No. 1,106,629; Elphick, British Pat. No. 859,895; and Nottall, British Pat. No. 859,017, all of which disclose electronic printers without prescan.

Bestenreiner develops an "intensity indicating signal" that is used to avoid "stripes or striations" in the reproduced image. However, he does not develop the $D_{min}$, $D_{max}$, ΔD, $D_{sum}$ and $D_{comb}$ signals obtained by applicants invention to assist in matching the exposure of the negative to the contrast grade and exposure index of the reproduction material.

Kelly uses a prescan to achieve "automatic localized micro-contrast of incremental areas of negative images." He employs a multicontrast paper, and divides his density signals into categories which then cause changes in the spectral content of a CRT light source, thereby modifying the effective contrast of the reproductionn material to meet the requirements of the image to be reproduced.

Applicant's invention, to the contrary, modifies the exposure level and contrast excursion range of the image to be reproduced in order to achieve gross contrast control, and relies on the use of a single grade of paper (usually of a higher than normal contrast) for "micro-contrast" control.

Kelly's system employs a vidicon tube for scanning the image as it moves through the reading station, and a CRT for line exposure of the contact sandwich as it moves through the printing station. Applicant scans and prints "in situ" with a single CRT.

Kelly does not determine a $D_{sum}$ or $D_{comb}$ as does applicant. Kelly determines $D_{min}$ and five density ranges, while applicant determines $D_{min}$ and $D_{max}$ for the negative and then calculates ΔD. The concept of Kelly's system is to fit the paper to the negative, while applicant alters the effective contrast range of the negative to fit the contrast acceptance range of the paper.

Kelly uses specular light for density scanning, and diffuse light for printing. Under certain conditions, the Callier effect will cause such a system to generate erroneous density readings. Applicant uses identical illumination for both reading and exposing.

Finally, there is one anomalous reference. Neale, British Pat. No. 906,146 uses an expensive "flood gun" type of CRT which prescans the negative to develop a luminous image "mask" which is applied to the image receiving material when the "flood gun" is activated. However, Neale does not compute $D_{min}$, $D_{max}$, ΔD, or $D_{sum}$ for use in altering the various images in order to enable them to fit the brightness acceptance range of the printing material, as does applicant.

SUMMARY OF THE INVENTION

It is one object of the invention to measure, in a scanning electronic dodging photoprinter and by means of a raster scan (hereafter called the prescan) which occurs prior to the exposing scan, the maximum and minimum densities present in the photography to be reproduced.

It is another object of this invention to obtain an integrated density signal ($D_{sum}$) representative of all of the prescan densities measured in the photography to be reproduced.

It is a third object to derive a signal representing the difference between the maximum and minimum prescanned densities.

It is an additional object to employ the density difference signal to select an appropriate exposing system response.

It is a further object to use an intensity-modulated beamed CRT spot as a part of the raster prescan density-measuring technique.

Another object is to enable correct density measurements to be obtained even though the prescan raster is adjustable in area.

Yet another object is to enable the prescan raster to be smaller in dimensions than the subsequent exposing raster so that adjacency effects, such as physical masking of the printing stage, will not interfere with the prescan readings.

It is a related object to combine the prescan measured densities $D_{min}$, $D_{max}$, and $D_{sum}$ in a manner such that these signal elements can be preferentially weighed and employed as an exposure level control in a wide variety of photographic reproduction techniques.

Yet another object of the invention is to provide a method whereby the prescan occurs automatically, but only when required.

A related general object of the invention is to increase the flexibility with which any spot-type scanning electronic dodging light source may be used in photographic reproduction processes.

All of these objectives, and others that will become apparent from the following description of the preferred embodiment, are achieved through electronic control circuits which inhibit normal photographic exposure during the information-extracting prescan operation.

DESCRIPTION OF THE PREFERRED EMBODIMENT

It is well known that the control of printing contrast by means of electronic dodging tends to produce results that are scientifically superior in their information content, but pictorially unpleasing. McIntosh, in U.S. Pat. No. 4,265,532, acknowledges this deficiency and provides for its alleviation by means of a manually adjustable fine exposure level control, and the manual selection of dodging grade.

Figure 1A:
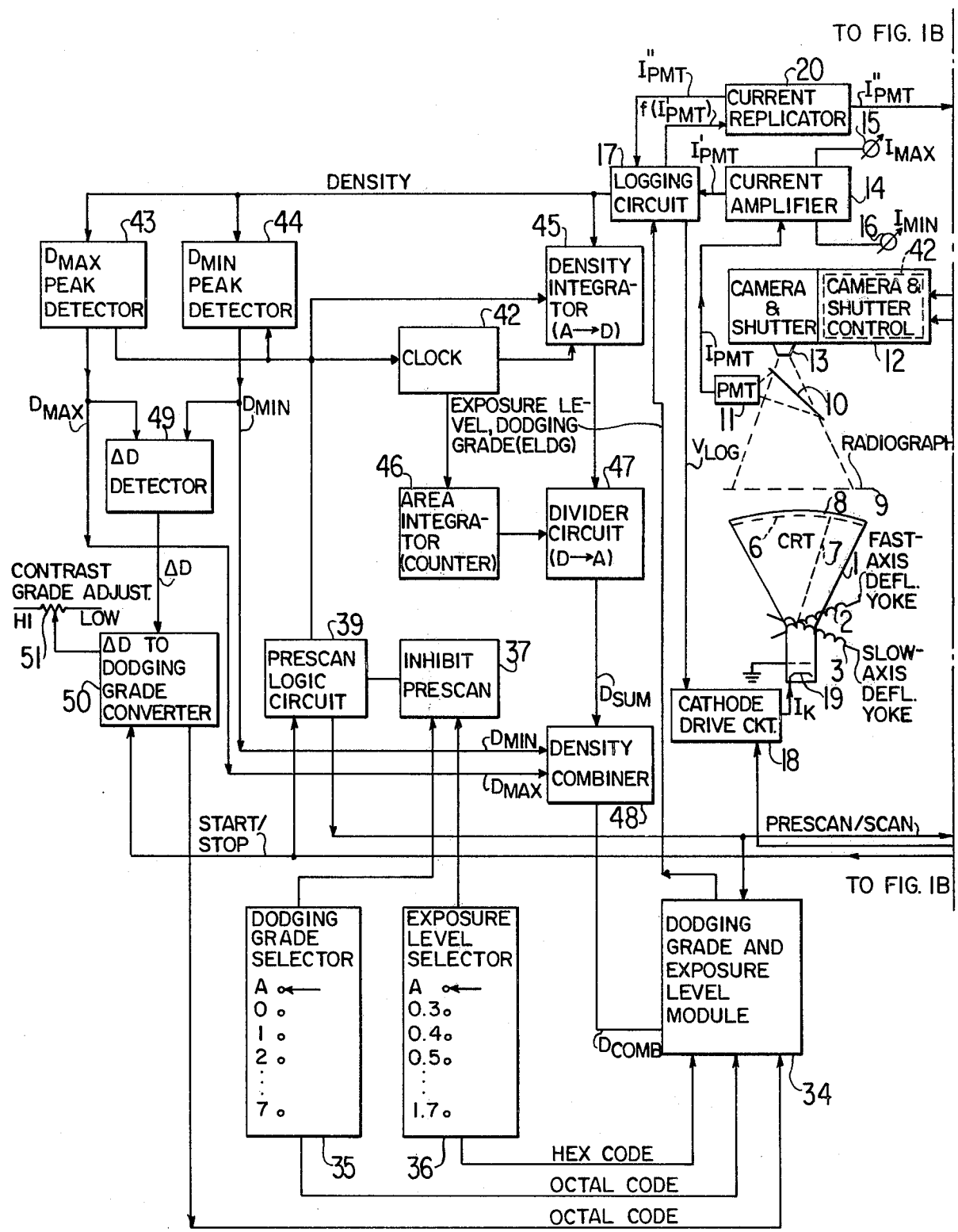
FIGS. 1A and 1B form a block diagram of an IM-VM CRT Dodging Printer showing an embodiment employed for the reproduction of original radiographs in reduced form, in which the prescan circuits are placed in juxtaposition to the exposing scan circuits.
Figure 1B:
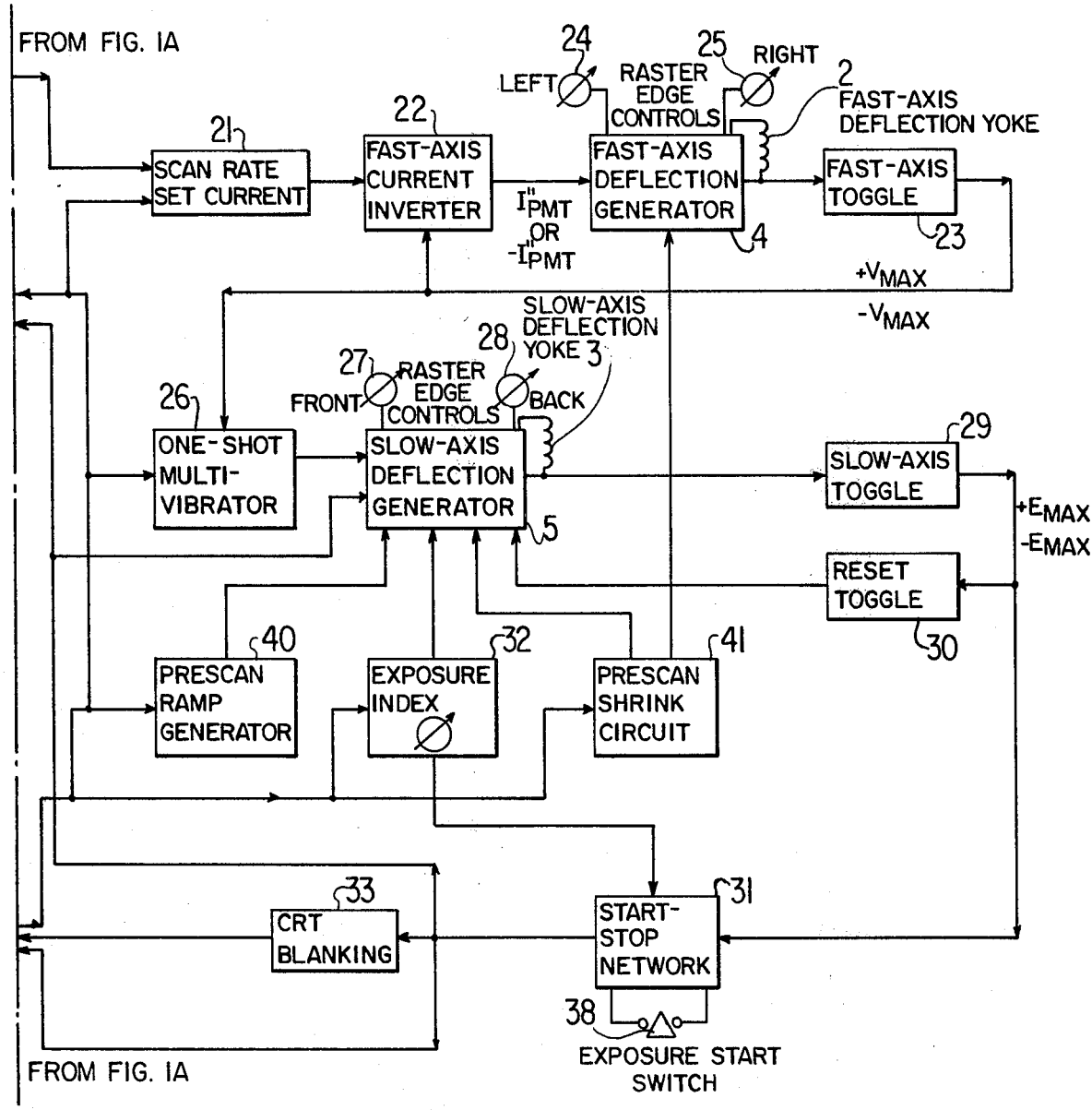
Figure 2:
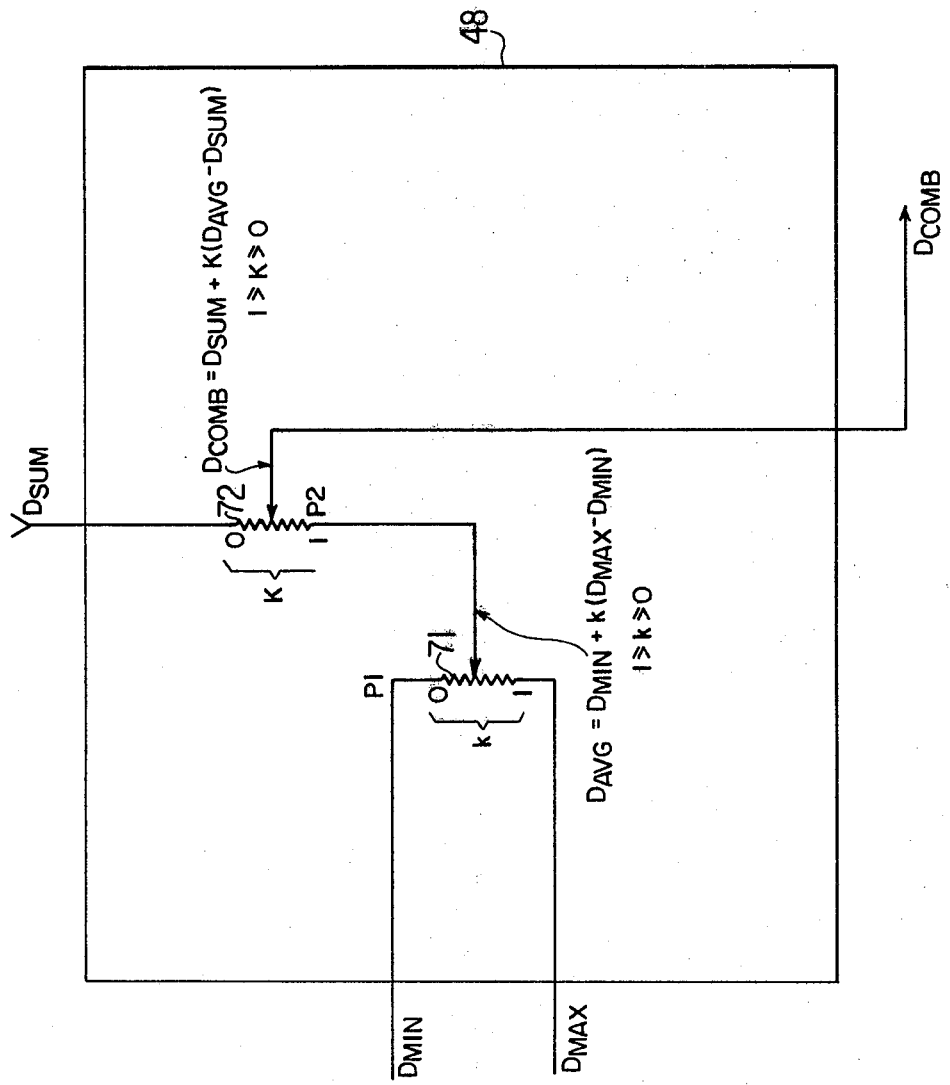
FIG. 2 is a partial schematic showing particular density-combining elements.

In furtherance of these objectives, the circuits disclosed in FIGS. 1A and 1B, and in FIG. 2, illustrate a method whereby each photograph to be reproduced is prescanned automatically within a time period of about 200 milliseconds or less. Where even this loss of time is objectionable or if the user prefers to make his own choice of exposure parameters, these automatic features can be disabled. The prescan action can also enable the user to manually select the fine exposure level, while the dodging grade is determined automatically, or vice versa.

The present invention provides a prescan system in conjunction with a printer of the type disclosed in McIntosh, U.S. Pat. No. 4,265,532. During the prescan the system evaluates the negative to generate a $D_{min}$ signal representative to the minimum density in the negative, a $D_{max}$ signal representative of the maximum density in the negative, and a $\Delta D$ signal representative of the difference between $D_{min}$ and $D_{max}$.

After $\Delta D$ has been determined by the prescan, it is compared, in a dodging grade comparative circuit 50, to a preset value that corresponds to the contrast acceptance range of the image receiving media in the printer. The comparator circuit seeks a contrast excursion range that will cover the range from $D_{min}$ to $D_{max}$. The contrast excursion range selected by the comparator circuit takes the form of a diode pair chosen from among a group of diode pairs located in the dodging grade module 34. These diode pairs and their mode of selection are similar to the diode pairs 133–138 shown in FIG. 6 of McIntosh, U.S. Pat. No. 4,265,532, except that seven different excursion ranges are provided for in this application.

The dodging grade converter circuit 50 thereby enables the system to automatically select the diode pair which will provide the least amount of dodging required to maintain the exposing image within the contrast acceptance limits of the image receiving material, as determined by the preset value entered by the operator by means of variable resistance means 51, the contrast grade adjustment.

The system may also be equipped with indicator means mounted near the Dodging Grade Selector 35 which could then provide the operator with densitometric readouts of $D_{min}$, $D_{max}$, $\Delta D$ and the contrast excursion range that the prescan system has determined to be most appropriate for reproduction of the negative just analyzed, on the chosen printing material. The operator can then, if desired, compare the recommended amount of dodging with the densitometric data and make an independent choice as to the actual amount of dodging to be employed. If the operator determines that a different range of dodging is desirable, that range can be entered on Dodging Grade Selector 35, whereupon the exposure cycle may be initiated at switch 38.

The prescan system also determines two separate exposure levels automatically. The first such signal is $D_{sum}$ which is derived by: $D_{sum}=(1/n)(D_1+D_2\ldots D_n)$ by circuits 45, 46 and 47. This is an averaged sum of all density points sampled during the prescan, and can be used to determine the proper exposure level for each negative evaluated by the prescan system. The present invention, however, also provides a means for generating a $D_{comb}$ signal, as follows: $D_{comb}=(1-K)\cdot D_{sum}+(1-k)KD_{min}+K(k)D_{max}$. K and k are variable impedance means 71 and 72 (illustrated in FIG. 2) that enable the operator to bias the exposure level to $D_{sum}$, to $D_{min}$, to $D_{max}$ or to $D_{avg}$, as desired. When means 72 is set to 0, $D_{sum}$ is selected as $D_{comb}$. As impedance 72 is increased, more emphasis is placed on the $D_{min}$, $D_{max}$ and $D_{avg}$ functions represented by impedance 71. As illustrated, $D_{avg}$ is a median figure since only $D_{min}$ and $D_{max}$ are summed and divided. By manipulation of controls 71 and 72 together, the operator can bias the exposure level to $D_{min}$ pr to $D_{max}$, if desired. The $D_{comb}$ feature makes this prescan system very versatile and adaptable to many difficult types of photoprinting.

Aerial reconnaissance photography might well be biased to $D_{sum}$ but pictorial photography is more likely to be biased towards $D_{min}$ or $D_{max}$, depending on whether the photography is of a "high key" or "low key" image.

As was the case with dodging grade selection, this system can provide a readout enabling the operator to choose between the automatic exposure level determined by the system, or one of the exposure levels determined by manual adjustment of Exposure Level Selector 36.

The exposure level automatically determined by $D_{comb}$ (or manually entered by the operator at selector 36) is then combined with the contrast excursion range selected by the comparator circuit means 50 and 34 (or by the operator at selector 35) to provide an exposure midpoint and excursion range for the current replicator 20, through logging circuit 17. From this point forward, the exposure mode is as described for FIG. 6 of McIntosh, U.S. Pat. No. 4,265,532. By means of logging circuit 17, the output current of PMT 11 is modified to maintain it within the contrast excursion range and exposure level requirements determined by the DG/EL circuit 34, and is replicated by current replicator 20 to automatically modulate the CRT beam intensity through cathode drive circuit 18, and the beam sweep velocity through fast-axis current inverter 22 and deflection generator 4.

In the present invention, both intensity modulation (IM) and velocity modulation (VM) are employed, although the invention is applicable also to an IM only system, or to a VM only system. As will be discussed hereinafter, the prescan mode employs IM only, while the exposure mode employs both IM and VM control of the CRT.

The block diagram of FIGS. 1A and 1B, depicts a CRT 1 having a fast-axis deflection yoke 2 and a slow-axis deflection yoke 3, which are associated with a fast-axis deflection generator 4 and a slow-axis deflection generator 5, respectively. The CRT has a fluorescent screen 6 having well-known phosphor limitations, including persistence characteristics which are a non-linear function of the current density of CRT electron beam 7. This beam forms a luminous spot 8 on phosphor screen 6 which is located on one side of a radiography 9 (or other type of photographic transparency) while on the opposite side of transparency 9 a pellicle 10, photodetector 11 and camera 12 are disposed in a functional array. Camera 12 contains an apertured lens 13 and an electrically actuated light shutter (not shown).

Photodetector 11 is a photomultiplier tube in one preferred embodiment of the invention, powered by a high voltage supply (not shown). However, many other types of photosensors may also be applicable, depending upon the light level available to actuate the sensing syste. The photodetector output current $I_{pmt}$ is an input signal to current amplifier 14, which produces a replicated output current $I'_{pmt}$ which can range between limits set by $I_{max}$ and $I_{min}$ controls 15 and 16.

In general, circuits which employ semiconductor junctions to obtain a logarithmic current output tend to be slow in response at low currents. Therefore, current $I'_{pmt}$ is arranged to be of a preferential amplitude at its point of injection into logging circuit 17. It should be noted that while logarithmic operation is conceptually simpler in this application than might be true of other non-linear forms of response, a square-law or other comparable function could be provided with little change of complexity or accuracy. Logging circuit 17 receives three input signals and provides three outputs, each of which will be discussed hereafter. It is appropriate at this point, however, to delay consideration of the functions of the DENSITY output line and the EXPOSURE LEVEL, DODGING GRADE input line, until the basic scan circuits have been fully identified.

Input current $I'_{pmt}$ to logging circuit 17 produces an output signal $V_{log}$ which is applied, via cathode drive circuit 18, to the cathode 19 of CRT 1 as an intensity-modulating beam control current $I_k$. In its preferred and idealized form, current $I_k$ is about 2000 microamperes maximum, and 126 microamperes minimum, varying continuously in response to the density range (typically, 0–2.4 density units) existing in the photography to be reproduced. Note that the range of current $I_k$ is 2000/126, or about 15.87, and that the logarithm of 15.87 is 1.2. Under these conditions the intensity-modulated CRT cathode current portion of the IM-VM system provides one-half of the total range of density control of the exposing system.

The configuration consisting of CRT 1, radiograph 9, PMT 11, current amplifier 14, logging circuit 17, cathode drive circuit 18, and CRT cathode 19, forms an intensity-modulated negative feedback loop. Wherever the radiograph density is 0, the output current $I_{pmt}$ of photomultiplier tube 11 will be approximately 46 microamperes, current amplifier 14 output will be 1000 microamperes, logging circuit 17 output voltage $V_{log}$ will be −9.0 volts, and the CRT cathode drive circuit 18 output current $I_k$ will be 126 microamperes. Conversely, wherever radiograph 9 has a density of 2.4, the output of PMT 11 will be 2.9 microamperes, current amplifier 14 output will be 63 microamperes, logging circuit 17 output voltage $V_{log}$ will be 0.0 volts, and the CRT cathode drive circuit 18 output current $I_k$ will be 2000 microamperes.

Under the preceding conditions, the swing of voltage $V_{log}$ is from −9.0 volts to 0.0 volts for a density range in radiograph 9 of 2.4 units. Thus, $V_{log}$ exhibits a change of 3.75 volts per decade change in density. It should be noted that the exposing intensity correction represented by the luminous mask on the faceplate of CRT 1 is only 15.87 to 1, corresponding to a density range of 1.2, yet the output voltage $V_{log}$ from logging circuit 17 represents a density range of 2.4.

Current f ($I'_{pmt}$) constitutes a second output from logging circuit 17 and bears a non-linear relationship to current $I'_{pmt}$ derived from the output of current amplifier 14. Current f ($I'_{pmt}$) produces, in current replicator 20, two corresponding currents each identified as $I''_{pmt}$, where $I''_{pmt}$ is equal to, but of opposite polarity from, $I'_{pmt}$. One such current is fed back to logging circuit 17 for comparison to current $I'_{pmt}$. The other current $I''_{pmt}$ is fed forward to the scan rate set current circuit 21, where it can be passed on (or be replaced by yet another current, depending upon the operating cycle requirements) as input to fast-axis current inverter 22. This current inverter produces an output current $+I''_{pmt}$ or $-I''_{pmt}$ in response to a directional signal from fast-axis toggle 23.

The circuit formed by fast-axis deflection generator 4, in conjunction with left and right raster edge controls 24 and 25 and fast-axis deflection yoke 2, is of a type well known in the art, as disclosed by Folse in U.S. Pat. No. 3,036,497. Said generator produces a deflection current in fast-axis yoke 2 which results in a lateral translation of the CRT electron beam 7 at a velocity which is linearly related to the amplitude of $I''_{pmt}$ and hence, by regression, to the output current $I_{pmt}$ of photomultiplier tube 11 and the densities existing in radiograph 9.

In other words, a velocity modulation contrast control circuit is formed, comprised of CRT 1, radiograph 9, PMT 11, current amplifier 14, logging circuit 17, current replicator 20, scan-rate set current circuit 21, fast-axis current inverter 22, fast-axis deflection generator 4 and fast-axis deflection yoke 2. This circuit is not a negative feedback loop, inasmuch as the parameter controlled, electron beam deflection rate, is not the parameter sensed, namely, illuminance at the photocathode of PMT 11. Thus, as will become evident, the fast-axis deflection function can be modified or replaced without interfering with the action of the intensity-modulated loop described previously.

The output of fast-axis deflection generator 4 is sensed by fast-axis toggle 23 which, at each limit of deflection, experiences a state change from $+V_{max}$ to $-V_{max}$, or vice versa. When the output is $+V_{max}$ the fast-axis current inverter 22 produces a current $+I''_{pmt}$ while, when the output is $-V_{max}$ the output current of inverter 22 becomes $-I''_{pmt}$. At each state change of toggle 23, the one-shot multivibrator 26 provides an input pulse to slow-axis deflection generator 5, resulting in a step change in the output current through slow-axis yoke 3, as determined by the settings of front and back raster edge controls 27 and 28, respectively. In this way, the elements just discussed cooperate to produce a slow-axis deflection staircase current of a known form.

The slow-axis toggle 29 provides outputs to reset circuit 30 and to stop-start network 31. When slow-axis toggle 29 output is negative ($-E_{max}$) the reset circuit 30 is operational, causing slow-axis deflection generator 5 to reset to its starting condition. The start-stop network 31 counts the negative transistions of slow-axis toggle 29 and, in conjunction with the exposure index control 32, produces 1-2-4-8 etc. cycles of slow-axis CRT deflection. When the output of slow-axis toggle 29 is positive, the start-stop network 31, through CRT blanking network 33, enables the cathode drive circuit 18 to drive CRT 1 with a cathode current $I_k$.

Adjustment of the exposure index control 32, in addition to affecting the number of frames of the exposing cycle, also modifies the step size of the current staircase from slow-axis deflection generator 5. These two factors, taken in combination, control the coarse exposure level of the printer, which is precalibrated to the sensitivity (or photographic speed) of the image-receiving emulsion in camera 12.

As stated earlier, logging circuit 17 also receives an additional input, EXPOSURE LEVEL, DODGING GRADE, and provides an additional output signal, identified as DENSITY. The EXPOSURE LEVEL, DODGING GRADE (ELDG) input signal originates in the dodging grade and exposure level module 34, which is similar to that illustrated in FIG. 6 of U.S. Pat. No. 4,265,532. The ELDG input is capable of controlling logging circuit 17. In one extreme, the ELDG input may override the $I'_{pmt}$ input to circuit 17 from current amplifier 14, so that is various outputs are responsive only to the ELDG input. This condition exists when dodging grade selector 35 is set to its DG=0 condition. In this case, logging circuit 17 is responsive only to the setting of exposure level selector 36, via dodging grade and exposure level module 34. When dodging grade selector 35 is at its other extreme, DG=7, the dodging grade and exposure level module 34 is totally inhibited so that logging circuit 17 is responsive only to current $I'_{pmt}$ from current amplifier 14. For settings of DG=1 through DG=6 of selector 35, both inputs $I'_{pmt}$ and ELDG affect logging circuit 17 in reciprocally related amounts. The output signal from module 35 to module 34 is in octal form.

In a preferred embodiment the exposure level selector 36 has 15 manually selectable positions, equivalent to density segments from 0.3 to 1.7 in radiograph 9, and provides its output signal to module 34 in hexadecimal form. When the dodging grade selector 35 is at DG=0 these signal levels, via the dodging grade and exposure level module 34, produce at the outputs of logging circuit 17 a voltage $V_{log}$ and a current f ($I'_{pmt}$) equal to those which would be produced by photographic densities of the same values in radiograph 9 or other similar transparency. Correspondingly, the cathode current $I_k$ of CRT 1, and the deflection rate of electron beam 7, are the same as those which would be produced by the appropriate photographic densities.

In order to evaluate the operation of the circuit of FIG. 1 in its prescan mode, it will be assumed that dodging grade switch 35 and exposure level switch 36 have each been adjusted to the selectable position identified as "A". Each selector has an output line to inhibit the prescan, via module 37. If either dodging grade selector 35, or exposure level selector 36, or both, are set to the "A" position, meaning that automatic prescan is desired, it will take place when the exposure is initiated by momentary closure of start exposure switch 38. In the circumstance that neither selector is set to "A", the inhibit module 37 will activate and the prescan mode will be bypassed.

Upon activation of start switch 38, an inhibit signal is removed from slow-axis deflection generator 5 and, via reset circuit 30, said generator output signal causes the CRT electron beam 7 to begin to retrace toward the preset back raster edge position. Simultaneously, prescan logic circuit 39 is actuated and provides signals to the dodging grade and exposure level module 34, the prescan ramp generator 40, exposure index 32, prescan shrink circuit 41, one-shot multivibrator 26, scan rate set current circuit 22 and the camera and shutter control 42. The prescan shrink circuit 41 reduces the effective front, back, left and right raster edge limits by about 15%, thereby confining measurement to the central 70% of the image area. The prescan ramp generator 40 will inject a continuous current into the slow-axis deflection generator 5, the exposure index 32 and one-shot multivibrator 26 will be inhibited, and the scan rate set current 21 will be switched from a current $I''_{pmt}$ to some other constant current having a nominal value of 1.0 milliampere. Lastly, the camera and shutter control 42 will be inhibited so that the shutter solenoid (not shown) will remain deactivated, and the dodging grade and exposure level module 34 will be inhibited to prevent errors in sensing.

When slow-axis toggle 29 detects the prescan raster edge limit current, its output will change state to $+E_{max}$ and the CRT cathode drive circuit 18 will be allowed to unblank, via blanking generator 33 and start/stop network 31. Therefore, the loop consisting of CRT 1, radiograph 9, PMT 11, current amplifier 14, logging circuit 17 and the cathode drive circuit 18 producing current $I_k$, will become unrestrained. Thus, the voltage $V_{log}$ at every instant during prescan will represent the sensed specular density of radiograph 9. The prescan ramp generator 40 and the switched scan rate set current circuit 21 cooperate to produce, in conjunction with fast-axis deflection generator 4 and slow-axis deflection generator 5, a raster of predetermined characteristics, unaffected by any density attributes of radiograph 9. Note that a constant scan rate current will cause the fast-axis deflection of electron beam 7 to occur at a constant velocity which, in the preferred embodiment, is about 20,000 inches/second.

As mentioned earlier, prescan occurs in about 200 milliseconds. Thus, a 4000 linear inch pattern is traced out for the largest usable prescan raster. A raster bounded by X and Y dimensions such as 15"×18", for example, has an area of 270 square inches. If prescan covers only 85% of each axis, then the monitored area is about 200 square inches, and each square inch evaluated photoelectrically is equivalent to 20 linear inches of scan. This factor is important because it represents the conversion of area determination from an XY product function to a simple time-keeping, pulse-counting activity.

In the prescan mode, the output $V_{log}$ of logging circuit 17 represents the density of radiograph 9 at every point scanned (where such density is equal to or less than the maximum permitted by known CRT faceplate contrast limitations). It follows, therefore, that the output line identified as DENSITY must carry some linear function of $V_{log}$. In fact, in the preferred case, $V_{log}$ and DENSITY are the same. The high scan rate of 20,000 inches per second is practical only if phosphor persistence, which is a non-linear function of screen loading in terms of beam current per square centimeter of phosphor scanned, is negligible, i.e. about 5 microseconds or less. Therefore, the use of an intensity-modulated prescan, with maximum density, may well produce a light persistence of 5 microseconds on the screen for $D_{max}$, with a beam current $I_k$ of 2000 microamperes, while 50 microseconds may be the phosphor decay time for $D_{min}$ at $K_k$=126 microamperes. Because, in the IM-VM combination, all densities sensed are of twice their total value, a phosphor persistence to the 10% decay point resulting from a cathode current of 126 microamperes will appear electronically as if it has been reduced to a persistence of 1%. This effect is not true for a prescan in which both intensity and velocity remain constant, because the measurement performed would necessarily require sensing of the full dynamic change. Furthermore, if the intensity-modulated prescan were for an IM only system, the CRT beam current change and screen loading range would have to be much greater, as also would be the resulting persistence. Similarly, if the prescan were velocity modulated only and PMT sensitivity were kept constant, then once again the measurement performed would be over the full dynamic range of densities. The persistence considered would be to the 1% level and in order to prevent phosphor burning, would have to be arranged at a constant but moderate screen loading.

In short, the intensity-modulated prescan in an IM-VM scanning electronic dodging printing system enables more accurate density measurements to be made with any given phosphor, and at higher scanning rates.

In addition to its other signals, prescan logic circuit 39 also controls clock 42, $D_{max}$ peak detector 43, $D_{min}$ peak detector 44 and analog to digital density integrator 45. During the standby mode of the printer, prior to prescan, peak detectors 43 and 44 are in a reset or clear condition; clock 42 is off, and density integrator 45 is clamped to zero. Once prescan begins, clock 42 cycles until the end of the prescan period and provides two outputs, one to density integrator 45 and the other to area integrator 46. As explained earlier, area integration of data from a raster-traced scan can be achieved digitally, in this case with a 12-bit ripple counter of a known type. Density integrator 45 consists of a conventional integrator coupled to such a 12-bit counter. The output of density integrator 45 is divided, in divider circuit 47, by the output from area integrator 46, producing an output $D_{sum}$ which is fed to density combiner 48. In the present embodiment, $D_{sum}$ is an analog voltage level of 9.0 volts for 0.0 density and 0.0 volts for density 2.4. The $D_{max}$ and $D_{min}$ peak detectors 43 and 44, respectively, are well-known sample-and-hold circuits which monitor the DENSITY output from logging circuit 17. They are reset prior to prescan and sample the excursions of the DENSITY line during prescan. At the end of prescan, the output from the $D_{min}$ peak detector 44 should be a voltage approaching +9.0 volts as an upper limit, and from the $D_{max}$ peak detector 43 a voltage approaching 0.0 volts as a lower limit.

$D_{max}$ and $D_{min}$, as voltages, are applied to density combining circuit 48, detailed in FIG. 2, which illustrates a method of combining these signals to form $D_{comb}$. This combination is presented in such a manner that the prescanned exposure level $D_{comb}$ can be applicable to any known class of photography. The mixing equation for density combiner 48 is:

$$D_{comb}=(1-K) D_{sum}+(1-K) K D_{min}+K(k) D_{max}$$

Where:
$D_{min}$ is the peak detected minimum input density.
$D_{max}$ is the peak detected maximum input density.
$D_{sum}$ is the integrated input density.
$D_{comb}$ is the combined output density.
K is a fraction representing the positional displacement of the arm of potentiometer 72 (FIG. 2).
k is a fraction representing the positional displacement of the arm of potentiometer 71 (FIG. 2).

It is evident from FIG. 2 and the combining equation that any exposure level desired, within the bounds of $D_{min}$ and $D_{max}$, is accessible by means of two potentiometer settings. The output $D_{comb}$ from density combiner 48 is one input to dodging grade and exposure level module 34 and, if exposure level selector 36 is in the "A" position, $D_{comb}$ will be the exposure level used in the exposing scan following the prescan. The outputs $D_{max}$ and $D_{min}$ of peak detectors 43 and 44 are applied as inputs to $\Delta D$ detector 49, which has its output $\Delta D$ applied to the $\Delta D$-to-dodging-grade converter 50 (hereafter called "dodging grade converter"). The signal $\Delta D$ has as one limit an output of 0.0 volts, and as another limit, a predefined maximum voltage. In the preferred embodiment $D_{max}$ is a voltage equivalent to a density of 2.4. Dodging grade converter 50 converts the analog signal expressing the density range of radiograph 9 to a numeric dodging grade level within the range 0–7, and furnishes it as an octal code to module 34.

The basis for dodging grade conversion is a comparison of the density range of the photographic transparency to be reproduced to a known density range acceptable to the reproducing emulsion. The latter range is entered into the prescan system via the contrast grade adjust potentiometer 51, associated with dodging grade converter 50. As an example, if the reproduction capability of the receiving emulsion extends over a density range of 1.5, and the sensed $\Delta D$ of radiograph 9 is 0.9 in a first case, 1.7 in a second case, and 3.0 in a third case, then the first case requires no dodging, the second case requires a dodging grade DG=2, and the third case requires a DG=7 dodging grade.

While the foregoing system has been described in detail for a black and white photographic printer, the principles disclosed are equally applicable to a printer for color photography, where the "color-masked" image must also be matched to the printing paper being used, and where the control of image contrast is made more difficult because color printing papers are not provided in various contrast grades. When equipped with a CRT having suitable spectral emission, the present invention is capable of generating electronic luminous masks which are adjustable with respect to each of the primary colors involved in color reproduction, as well as the electronic contrast correction of the neutral component of the image to be reproduced.

As was previously discussed, the $D_{min}$ and $D_{max}$ detectors 43 and 44 are well known sample and hold circuits. Likewise, density integrator 45 and area integrator 46 hold this total accumulated count throughout the exposure mode, before being reset to zero.

Thus, the densiometric data obtained during the prescan is maintained throughout the exposure mode for reference by the DG/EL module 34. If desired, separate holding circuits could be provided for peak detectors 43 and 44, and for divider circuit 47. This would afford the operator as much time as desired to review the densitometric display and to choose either manual or automatic operation of the printer.

The foregoing description has reviewed conditions which relate mainly to non-contact printing, where either a reduction or an enlarging operation requires the projection of an image through a lens, associated with a shutter to prevent photographic exposure until a desired instant. This condition does not exist in contact printing, where a shutter cannot be interposed between the original transparency and the raw stock on which the reproduction will be made. Therefore, prescan in contact printing requires some modification of the general concept, as is illustrated in FIG. 3.

Immediately above projection lens 13a there is a lens filter rotary solenoid assembly 82, 83, a clear stage plate 84, the photographic transparency 9, the image receiving emulsion 12a, a PTM filter solenoid assembly 80, 81, and a PMT 11. In filter solenoid assemblies 80, 81 and 82, 83 there are optical filters 81a and 83a respectively, cut from the same filter stock. If photographic emulsion 12a is not panchromatic, then filters 81a and 83a might be selected for a spectral passband outside the sensitivity range of emulsion 12a but within the spectral range of PMT 11. If, however, photographic emulsion 12a is panchromatic, then the selected filters must be neutral and of such density values as to minimize the amount of exposure attributable to the prescan cycle.

Figure 3A:
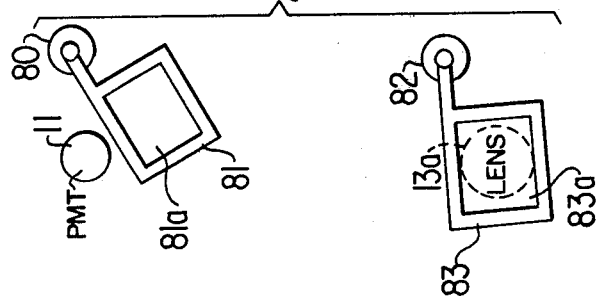
FIG. 3A depicts the positions adopted by the filters during the prescan mode.
Figure 3:
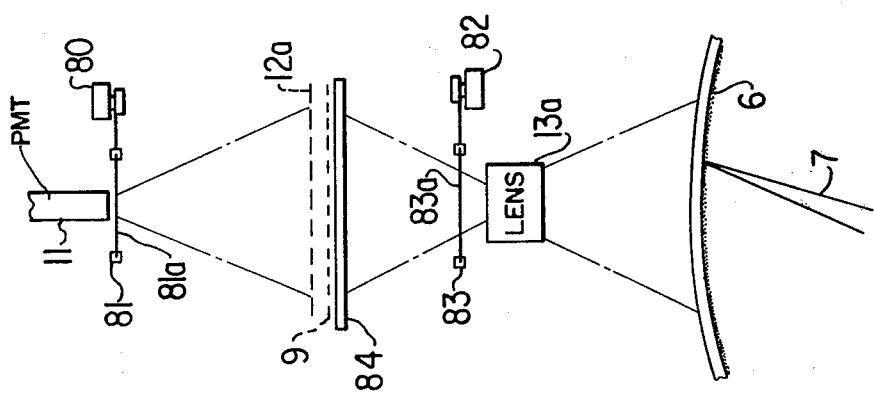
FIG. 3 shows, in diagrammatic form, the disposition of rotary solenoid-actuated filters in the optical paths of a scanning electronic contact printer.
Figure 3B:
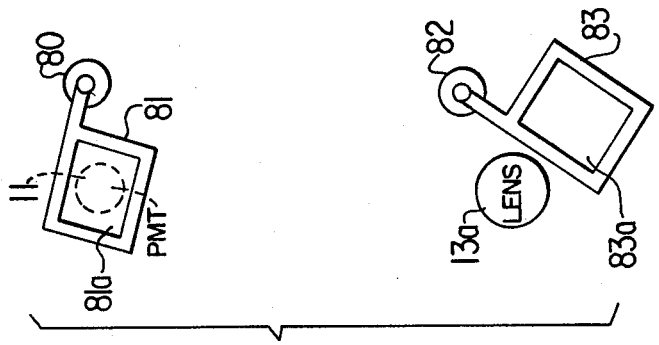
FIG. 3B illustrates the filter positions used during the exposing mode.

FIGS. 3A and 3B illustrate the disposition of filter assemblies 81 and 83 in the prescan (FIG. 3A) and exposing (FIG. 3B) modes. During prescan, the lens filter assembly 83 covers the lens and reduces the actinic light at photographic emulsion 12a to a low level. Because PMT 11 is not covered by filter assembly 81, its optical sensitivity is high and the low level of light passing through transparency 9 and receiving emulsion 12a, in combination, results in a PMT output current K. After prescan, lens filter assembly 83 is rotated to the position shown in FIG. 3B, so that the actinic light level at photographic emulsion 12a is high. Conversely, PMT filter assembly 81 reduces the light level to PMT 11 photocathode, producing a low net PMT sensitivity. The low PMT sensitivity and high light level, however, combine to produce an output current K. In short, the alternating disposition of filters 81a and 83a in the optical paths shown in FIGS. 3A and 3B enables an essentially constant measuring sensitivity to be maintained, together with essentially zero prescan exposure of receiving emulsion 12a. Note that the prescan measurements of density are diffuse, by virtue of the location of photographic emulsion 12a, and that the subsequent scanning exposure is performed in a contact mode. Hence, there is no Callier effect.

In summary, the operation of prescanning, as here disclosed in a scanning electronic dodging photographic printer, can be caused to occur automatically and in situ relative to a subsequent main exposure. The Callier effect is compensated for in projection printing, and is not present in contact printing. Two types of density information are derived by prescanning, a summation $D_{sum}$ of all prescanned points, and measurement of the density extremes, $D_{min}$ and $D_{max}$. This density data can be combined, at the users option, to produce an appropriate exposure level matched to the receiving emulsion and the class of photography being reproduced. The prescan, which is adjustable to accommodate a wide range of formats, is normally limited to a central part of the image area and usually occurs in millisecond time periods. Printing contrast range is evaluated automatically, and a dodging grade appropriate to the parameters of the photographic emulsion in use is selected. This prescan system is adaptable to contact and projection printing, and can be activated or inhibited at the users option. Other techniques will be obvious to those skilled in the art and all fall within the spirit of this invention.

What is claimed is:

1. Automatic contrast and density control means for a scanning photographic printer that uses a beamed spot of radiant energy to expose an image receiving media from an image carrying media, said control means comprising:
   a. circuit means for providing a prescan of the image carrying media by said beamed spot of energy before the exposure of said image receiving media;
   b. photosensor means for measuring a portion of the radiant energy that is modulated by the image carrying media to generate a density-related signal;
   c. circuit means for establishing a $D_{min}$ signal representative of the minimum density of said image carrying media, a $D_{max}$ signal representative of the maximum density of the image carrying media, a $\Delta D$ signal representative of the difference between $D_{min}$ and $D_{max}$ and a $D_{sum}$ signal representative of the sum of the densities sampled during the prescan;
   d. comparative circuit means for automatically comparing the $\Delta D$ signal to a preset value representative of the contrast range of the image receiving media and generating a contrast excursion range signal;
   e. control means for modulating said beamed spot of radiant energy, said control means responsive to said $D_{sum}$ density level signal and said contrast range excursion signal to set the exposure level and contrast excursion range applied to said image receiving media during the exposure of the image recording media.

2. An automatic contrast and density control means for a photographic printer as claimed in claim 1 wherein said contrast and density control means further includes a density combiner means with variable impedance means K and k to generate a $D_{comb}$ signal of the form:
$$D_{comb} = (1-K) \ D_{sum} + (1-k) \ K \ D_{min} + K(k) \ D_{max};$$
whereby an operator can bias the exposure level supplied to said control means in the direction of $D_{min}$, $D_{max}$ or $D_{sum}$, as desired.

3. An automatic contrast and density control means for a photographic printer as claimed in claim 1 wherein said beamed spot is intensity modulated during the prescan.

4. An automatic contrast and density control means for a photographic printer as claimed in claim 1 wherein the prescan image area is a predetermined percentage of the image carrying media area.

5. An automatic contrast and density control means for a photographic printer as claimed in claim 1 wherein said comparative circuit means further includes a pair of selector circuits for receiving either automatic or manually determined signal levels for both the exposure level signal and the contrast excursion range signal supplied to said control means.

6. An automatic contrast and density control means for a photographic printer as claimed in claim 1 wherein said printer is a projection printer and said image receiving material is positioned behind a shutter, said shutter being closed during said prescan and open when said image receiving media is exposed.

7. An automatic contrast and density control means for a photographic printer as claimed in claim 1 wherein said printer further comprises a pair of moveable opposing filters, each of said filters having an engaged position to attenuate said beamed spot and a disengaged position out of the path of said beamed spot; the first of said filters being positioned between said beamed spot and said image receiving media during said prescan, and out of said path during exposure; the second of said filters being positioned between said image receiving media and said photosensor to attenuate said spot during exposure, but out of the path of said spot during said prescan.

8. An automatic contrast and density control means for a photographic printer as claimed in claim 7 wherein said printer is a contact printer and means are provided to hold said image carrying media and said image receiving media in intimate emulsion to emulsion contact.

9. Exposure level control means for a photographic printer using a cathode ray tube (CRT) to expose an image receiving media, said means comprising:
   a. a CRT light source having an electron beam, a light emitting phosphor screen, and dynamic control means for said beam to provide a scanning spot of radiant energy on said screen;

b. said dynamic control means having a first prescan mode for scanning a predetermined portion of an image carrying media, and a second exposure mode to expose said image receiving media with dynamic contrast control masking of said scanning spot;

c. photosensor means for measuring a portion of the radiant energy after it is modulated by the image carrying media to generate a density-related signal;

d. circuit means for establishing a $D_{sum}$ signal wherein $D_{sum}=(1/n)(D_1+D_2+D_3\ldots D_n)$ wherein $D_{sum}$ is representative of the sum of the densities sampled during the prescan;

e. dynamic control means for said CRT responsive to said $D_{sum}$ signal to automatically establish the correct exposure level of said CRT during the exposure mode;

f. support means for said image carrying media and said image receiving media to hold them in a fixed relationship with respect to each other during both the prescan and the subsequent exposure.

10. An automatic exposure control means for a photographic printer as claimed in claim 9 wherein said exposure level control means further includes circuit means for establishing a $D_{min}$ signal representative of the minimum density of said image carrying media, a $D_{max}$ signal representative of the maximum density of the image carrying media and a $\Delta D$ signal representative of the difference between $D_{max}$ and $D_{min}$.

11. An automatic exposure control means for a photographic printer as claimed in claim 10 wherein said exposure control means further includes a density combiner means associated with variable impedance means K and k to generate a $D_{comb}$ signal as follows:

$$D_{comb}=(1-K)\,D_{sum}+(1-k)\,K\,D_{min}+K(k)\,D_{max}$$

whereby an operator can bias the exposure level supplied to the control means in the direction of $D_{min}$, $D_{max}$ or $D_{sum}$, as desired.

12. An automatic exposure control means for a photographic printer as claimed in claim 10 wherein said exposure level control means further includes a pair of selector circuits for selecting either automatic or manually determined signal levels for both the exposure level signal and the contrast excursion range signal supplied to said dynamic control means.

13. An automatic exposure control means for a photographic printer as claimed in claim 9 wherein said beamed spot is intensity modulated during the prescan.

14. An automatic exposure control means for a photographic printer as claimed in claim 9 wherein the image area selected for prescan is a predetermined percentage of the image carrying media.

15. An automatic exposure control means for a photographic printer as claimed in claim 9 wherein said printer is a projection printer and said image receiving material is positioned behind a shutter, said shutter being closed during prescan and open when said image receiving material is exposed.

16. An automatic exposure control means for a photographic printer as claimed in claim 9 wherein said printer further comprises a pair of opposing movable filters, each of said filters having an engaged position to attenuate said beamed spot and a disengaged position out of the path of said beamed spot; the first of said filters being positioned between said beamed spot and said image receiving media during said prescan, and out of said path during exposure; the second of said filters being positioned between said image receiving media and said photosensor to attenuate said spot during exposure, but out of the path of said spot during said prescan.

17. An automatic contrast and density control means for a photographic printer as claimed in claim 16 wherein said printer is a contact printer and said support means are provided to hold said image carrying media and said image receiving media in intimate emulsion to emulsion contact.

18. An automatic contrast and density control means for a photographic printer as claimed in claim 11 wherein said control means further comprises a sample and hold circuit, a display station and manual override means for contrast and exposure level control, whereby the control means will prescan the image carrying media, display the recommended exposure level and the contrast excursion range and enable an operator to choose either the automatic level of exposure and contrast control, or the manually determined level of either exposure, or contrast, or both.

19. An automatic photographic printer using a cathode ray tube (CRT) light source for exposing an image receiving media. The CRT beam intensity and deflection velocity are both automatically modulated to vary the exposure level and gross contrast excursion level applied to an image receiving media, said printer including:

a. a CRT light source having an electron beam, a light emitting phosphor screen and a fast x-axis and slow y-axis deflection control means surrounding said beam, wherein said electron beam generates a scanning spot of light energy on said screen;

b. photosensor means for measuring the intensity of a portion of the light modulated by the image carrying media to generate a density-related signal that is also predictably related to said modulated light;

c. prescan circuit means for providing a prescan of the image carrying media by said beamed spot of light before the exposure of said image receiving media;

d. automatic contrast and exposure level circuit means for establishing during said prescan a $D_{min}$ signal representative of the minimum density of said image carrying media; a $D_{max}$ signal representative of the maximum density of said image carrying media; a $\Delta D$ signal representative of the difference between $D_{min}$ and $D_{max}$; and a $D_{sum}$ signal representative of the sum of the densities sampled during the prescan;

e. comparative circuit means for automatically comparing the $\Delta D$ signal to a preset value representative of the contrast range of the image receiving media, to generate a contrast excursion range signal;

f. replicator means for producing first and second output currents in response to said $D_{sum}$ exposure level signal and said contrast excursion range signal as determined during said prescan;

g. modulator means responsive to said first output current to vary the intensity of said electron beam during the exposure of said image receiving media;

h. deflection control means responsive to said second output current to vary the scanning spot velocity during the exposure of said image receiving media.

20. An automatic photographic printer as claimed in claim 19 wherein said automatic contrast and exposure level circuit means further includes a density combiner circuit with variable impedance means K and k to generate a $D_{comb}$ signal as follows:

$$D_{comb} = (1-K) D_{sum} + (1-k) K D_{min} + K(k) D_{max}$$

whereby an operator can bias the exposure level supplied to the replicator means towards $D_{min}$, $D_{max}$, $D_{sum}$, or any combination thereof.

21. An automatic photographic printer as claimed in claim 19 wherein said beamed spot is intensity modulated during the prescan.

22. An automatic photographic printer as claimed in claim 19 wherein the image area selected for prescan is a predetermined percentage of the image carrying media area.

23. An automatic photographic printer as claimed in claim 19 wherein said printer further comprises a sample and hold circuit, a display station and manual override means for contrast and exposure level control, whereby the printer will prescan the image carrying media, display the recommended exposure level and contrast grade, and enable an operator to choose the automatic level of exposure and contrast or a manually determined level of either exposure or contrast or both.

24. An automatic photographic printer as claimed in claim 19 wherein said printer is a projection printer and said image carrying media and said image receiving media are separated; a shutter means between said scanning spot and said image receiving media, said shutter being closed during said prescan and open during the exposure of said image receiving material.

25. An automatic photographic printer as claimed in claim 19 which further includes a pair of filters mounted for opposing movement between said scanning spot and said photosensor, the first of said filters being positioned between said scanning spot and said image receiving material to attenuate said spot during said prescan, and out of said spot path during exposure, the second of said filters being mounted between said image receiving material and said photosensor to attenuate the modulated light during exposure, and out of the spot path during prescan.

26. An automatic photographic printer as claimed in claim 25 wherein said printer is a contact printer, and means are provided to hold said image carrying media and said image receiving media in intimate emulsion to emulsion contact.

27. A contact printer with automatic exposure control, said printer comprising:
    a. a light source, said light source having a pre-exposure measuring mode and an exposure mode;
    b. means for supporting an image receiving material and an image carrying material in intimate emulsion to emulsion contact, with said image carrying material placed between said light source and said image receiving material;
    c. photo sensor means for measuring the light modulated by said image carrying media during the pre-exposure mode and control means to adjust the intensity or duration of said light source during the exposure mode;
    d. a pair of identical filters with opposing movement, said first filter being positioned between said light source and said image receiving material to attenuate said light during the pre-exposure measuring mode, and positioned out of light path when said light source is in its exposure mode; said second filter being mounted between said image receiving media and said light sensor means to attenuate the light falling on said sensor during the exposure mode, and out of the light path during the pre-exposure measuring mode; whereby only the first of said filters attenuates the light between said light source and said photosensor during the pre-exposure measuring mode, and only the second of said filters attenuates the light between said light and said photosensor during the exposure mode.

28. A contact printer with automatic exposure control as claimed in claim 27 wherein said light source is a cathode ray tube (CRT) which generates a scanning spot to expose the image receiving media.

29. A contact printer with automatic exposure control as claimed in claim 28 wherein said printer also comprises circuit means for establishing a $D_{min}$ signal representative of the minimum density of said image carrying media, a $D_{max}$ signal representative of the maximum density of said image carrying media, and a $\Delta D$ signal representative of the difference between $D_{max}$ and $D_{min}$; said exposure control also including a comparative circuit to compare $\Delta D$ with a preset value representative of the contrast range of the image receiving media to determine a contrast excursion range for said CRT light source.

30. A contact printer with automatic exposure control as claimed in claim 29 wherein said CRT is intensity modulated during the pre-exposure mode and intensity and velocity modulated during the exposure mode.

* * * * *